Figure 2:
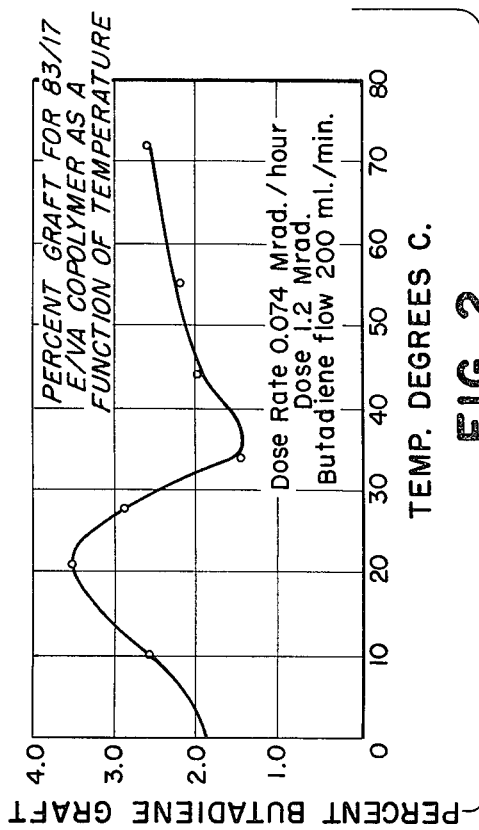

United States Patent [19]

DiRossi

[11] 3,959,410
[45] May 25, 1976

[54] BUTADIENE GRAFTED ETHYLENE-VINYL ACETATE HOT MELT ADHESIVE

[75] Inventor: Raymond R. DiRossi, Akron, Ohio

[73] Assignee: The Goodyear Tire & Rubber Company, Akron, Ohio

[22] Filed: Aug. 12, 1974

[21] Appl. No.: 496,610

[52] U.S. Cl. .......................... 260/878 R; 156/327; 428/462
[51] Int. Cl.² ................. C08L 23/26; C08F 255/02
[58] Field of Search ............................... 260/878 R

[56] References Cited
UNITED STATES PATENTS 3,366,560  1/1968  Yoshitake et al. ............. 260/878 R

FOREIGN PATENTS OR APPLICATIONS 45-21313  7/1970  Japan .......................... 260/878 R

*Primary Examiner*—Alan Holler
*Attorney, Agent, or Firm*—F. W. Brunner; R. H. Haas

[57] ABSTRACT

A structural hot melt adhesive of butadiene grafted ethylene-vinyl acetate. The butadiene graft is 1 to 12 percent by weight, preferably 4 to 8 percent by weight. The ethylene/vinyl acetate ratio is about 91/9 to 72/28, preferably about 83/17. Preferably grafting is done at room temperature using radiation. Peel adhesion on various fabric and metal substrates improved over ungrafted control samples from 100 to as much as 1500 percent.

2 Claims, 7 Drawing Figures

BUTADIENE GRAFTED ETHYLENE-VINYL ACETATE HOT MELT ADHESIVE

This invention relates to an improved hot melt adhesive of butadiene grafted ethylene-vinyl acetate (EVA) copolymer.

Hot melt adhesives, because of their thermoplasticity, set up rapidly and can accommodate high speed equipment. Because the adhesive system is 100 percent solids, no time is required for solvent evaporation or thermal curing.

Ethylene-vinyl acetate (EVA) resins have gained wide acceptance as hot melt adhesives in the packaging industry. In this application, the relatively low bond strengths permit easy disassembly of the packaged material by the consumer.

With product assembly applications, e.g. bonding insulation to metal parts, upholstered furniture, carpet manufacture, aircraft subassemblies, high strength adhesives are necessary. In only a limited number of cases can packaging adhesives meet the bond strength requirements for such applications.

A second area requiring high strength adhesive bonding is metal to metal adhesion. Currently polyester and polyamide adhesives predominate in this hot melt application. These latter adhesives are relatively expensive in comparison with EVA adhesives presently available.

It is known in the prior art to graft butadiene to EVA (e.g. to graft butadiene to an EVA substrate to alter its surface properties or to graft butadiene to an EVA latex paint) as well as to other resins, such as PVC (e.g. to improve impact strength). However, it has not heretofore been known to alter the adhesive properties of an EVA resin for use in hot melt adhesive applications by grafting butadiene thereto.

Applicant has now discovered a hot melt adhesive consisting of a 1 to 12 percent by weight butadiene grafted ethylene-vinyl acetate copolymer. The radiation grafting of butadiene to EVA results in a hot melt adhesive that retains original thermoplastic properties but has superior adhesion properties compared to the unmodified control polymer.

The graft rate is most efficient at low dose rates. Butadiene grafts to EVA at approximately 1 percent per 0.1 Mrad of radiation. Total radiation dosage for achieving high adhesion values generally requires less than 0.5 Mrads.

Hot melt adhesives of the type disclosed exhibit melt characteristics similar to those of an unmodified EVA resin.

The practice of this invention is illustrated by reference to the following examples which are intended to be representative rather than restrictive of the scope of this invention.

EXAMPLE 1

Three commercially available EVA copolymers (E/VA ratios 91/9, 83/17, 72/28)* were grafted by streaming the butadiene vapors (flow rate 200 ml min$^{-1}$) through 100 g samples of resin during gamma radiation exposure. Following irradiation, the excess unreacted butadiene was removed under vacuum and the resin weight gain recorded as percent graft.

*91/9 is U.S. Industrial Chemicals Co. E/VA resin designated UE 635.
83/17 is U.S. Industrial Chemicals Co. E/VA resin designated UE 630.
72/28 is Union Carbide Corp. E/VA resin designated UE 501.
All ratios are expressed in parts by weight.

Grafting reactions were performed using low to moderate doses (up to 6 Mrads) of gamma radiation at room temperature and a dose rate of 0.075 Mrads/hr. The effect of temperature on graft efficiency was studied for the 83/17 composition over the range 0°C. to 72°C. Strip adhesion samples were prepared by placing a few grams of the grafted copolymer between fabric, foil or film substrates and heating under pressure to melt the adhesive. Melt temperatures were inversely proportional to the vinyl acetate content of the copolymer. The 91/9 composition was melted at 320°F., the 83/17 composition was melted at 290°F. and the 72/28 composition was melted at 250°F. With all samples, heat and a ram force pressure of 40 × 10$^3$ lbs were maintained for ten minutes. Strip samples were pulled at a rate of 2 inches/min.

Results and Discussion

Grafting Rates

Figure 1:
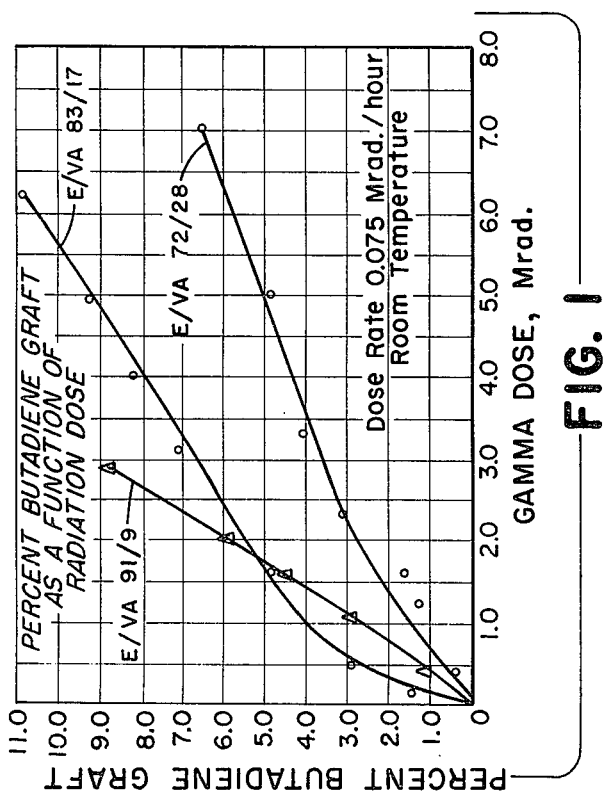

Butadiene graft as a function of radiation dose (Mrad) is shown in FIG. 1 for the three EVA compositions.

FIG. 2 shows the effect of temperature on the vapor grafting rate for the 83/17 composition. Grafting is most efficient at room temperature.

Adhesion Results

Figure 3:
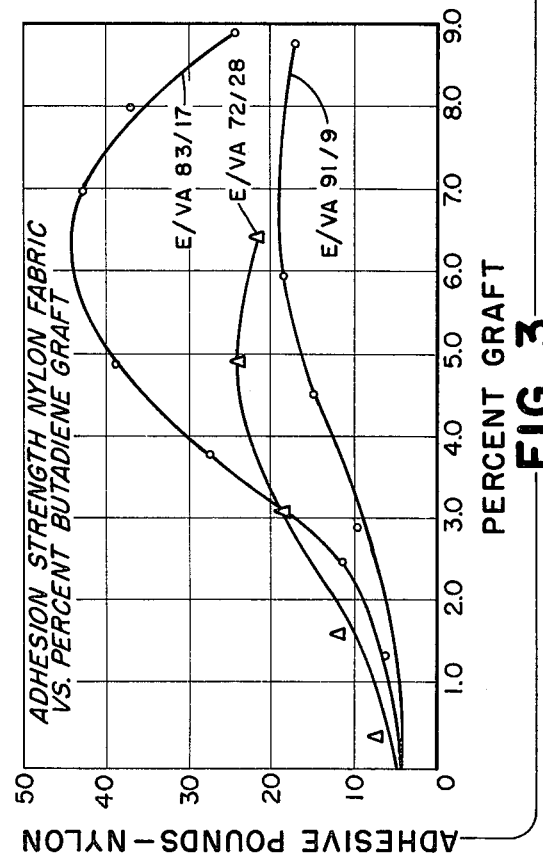

Adhesion to greige nylon fabric vs percent grafted butadiene is given in FIG. 3. Nylon gave greatest adhesion with the 83/17 copolymer.

Figure 4:
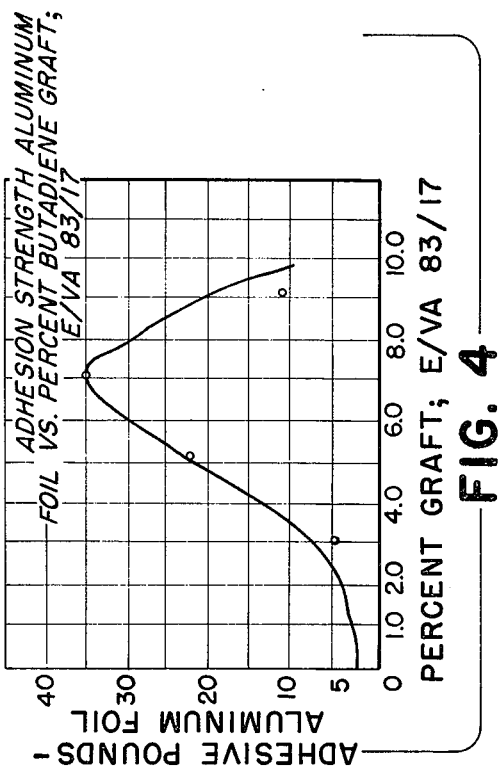

FIG. 4 shows the adhesion of aluminum foil as a function of butadiene content for the 17 percent vinyl acetate copolymer. Peel tests greater than 40 psi have been observed in several cases before foil failure.

EXAMPLE 2

Butadiene was radiation grafted to ethylene-vinyl acetate (E/VA ratio 83/17) by the method described in Example 1. Three dose rates, 0.029, 0.015, and 0.0075 Mrad/hr., were used to investigate the effect of radiation intensity on grafting rate.

Metal substrates were cut into 6 inches × 1 inch strips. Gauge thickness varied from 0.005 for steel, stainless steel and brass to 0.062 for aluminum and copper. Metal substrates were cleaned before applying the grafted resin and heat pressing. Steel, stainless steel and brass strips were soaked in acetone and wiped dry with paper toweling. Copper strips were first soaked in a dilute nitric acid solution, washed with distilled water, dried with paper toweling and finally polished with very fine steel wool. Aluminum substrates were polished with steel wool, rinsed in distilled water and dried with paper toweling.

Each substrate was placed in a strip mold cavity and approximately 2.5 grams of grafted EVA spread along its length. The top strip was set in place and the mold heated at 300°F. under a ram force pressure of 40 × 10$^3$ lbs for approximately three minutes to melt the adhesive. After melting was achieved, the samples were removed from the mold cavity and allowed to cool to room temperature.

Peel adhesion (90°) was measured by Method B, ASTM D-429.

Results and Discussion

Grafting Rates

Figure 5:
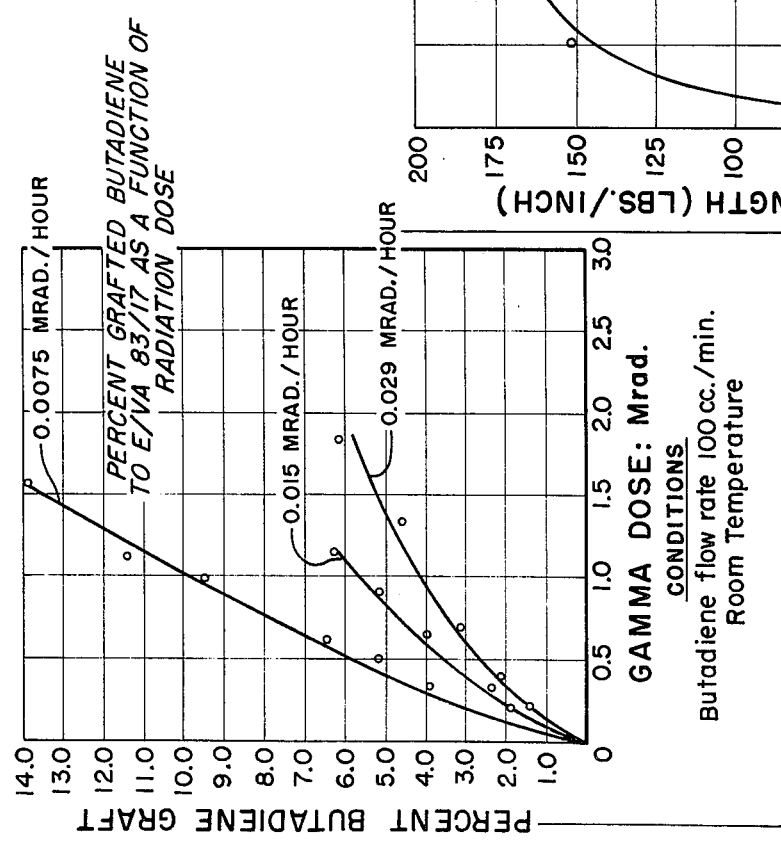

FIG. 5 shows percent grafted butadiene as a function of radiation dose for three different dose rates. Grafting efficiency, i.e. percent graft/dose, is improved by irradiating the polymer at progressively lower dose rates. Grafting rate is approximated by the equation $R = \sqrt{I}$ where $R$ is the grafting rate in percent graft per hour and $I$ is the dose rate in Mrads/hr.

Since grafting and crosslinking of EVA proceed simultaneously, and crosslinking has a first power dependence on $I$, the use of low dose rates shifts the ratio of the two competing reactions in favor of grafting. This would tend to limit the amount of gel found in the polymer. Gel is believed to be undesirable for good adhesion.

Adhesion Results

Figure 6:
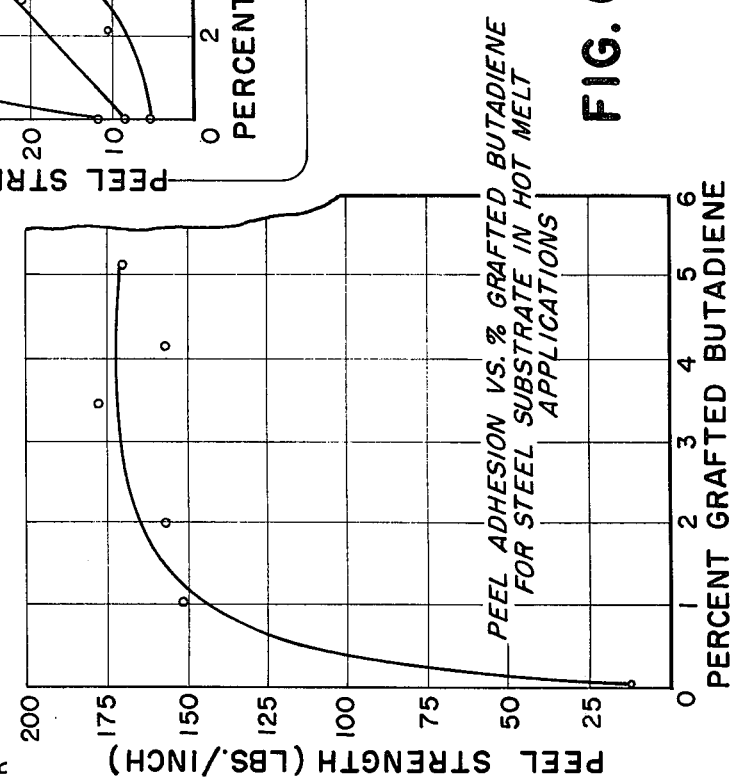

FIG. 6 shows peel adhesion for 0.005 gauge shim steel as a function of percent butadiene grafted EVA. Peel adhesion is increased from 11 lbs/inch for the control to an average value of 170 lbs/inch at the 2.5 to 5.0 percent graft level.

Similar results were expected for 0.005 shim stainless steel laminates. Although adhesion was significantly improved, the data were scattered. See Table I.

TABLE I

PEEL ADHESION (90°) - STAINLESS STEEL

| Percent Graft | No. of Trials | Average Peel Adhesion lbs/inch |
|---|---|---|
| Control | 2 | 16 |
| 1.2 | 5 | 116 |
| 3.5 | 3 | 44 |
| 4.4 | 3 | 96 |

TABLE I-continued

PEEL ADHESION (90°) - STAINLESS STEEL

| Percent Graft | No. of Trials | Average Peel Adhesion lbs/inch |
|---|---|---|
| 5.3 | 3 | 45 |

Figure 7:
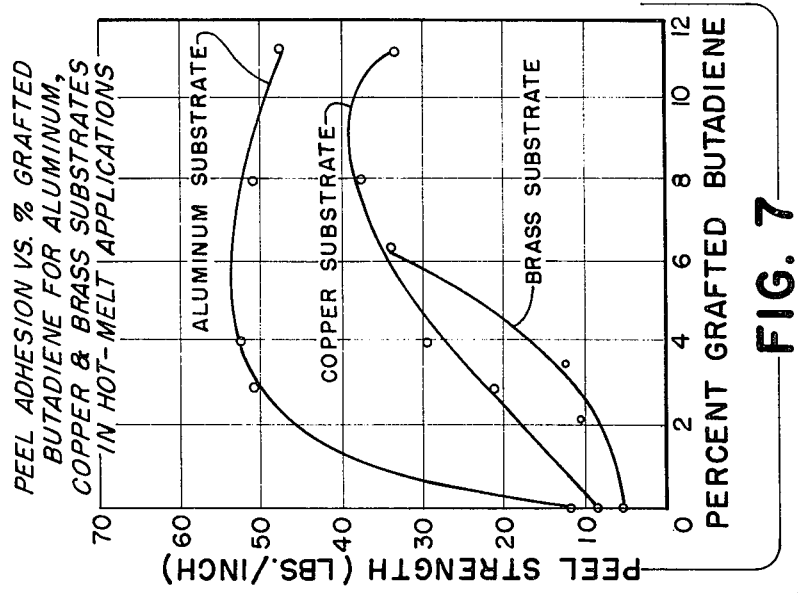

FIG. 7 shows peel adhesion as a function of percent butadiene grafted EVA for aluminum, copper and brass substrates. Aluminum adhesion increases rapidly at the lower percentages of graft (up to 4 percent), levels off between 4 and 8 percent and then starts to decrease beyond the 8 percent graft level. Increased gel content of the irradiated resin around 8 percent graft may contribute to the reduction in adhesive strength. Copper adhesion shows a similar pattern by increasing up to 8 percent graft and starting to decrease at higher graft levels. In the case of brass substrates, the downward trend in adhesion strength would be expected in the region beyond 8 percent butadiene graft.

While certain representative embodiments and details have been shown for the purpose of illustrating the invention, it will be apparent to those skilled in this art that various changes and modifications may be made therein without departing from the spirit or scope of the invention.

What is claimed is:

1. A hot melt adhesive consisting of a 1 to 12 percent by weight butadiene grafted ethylene-vinyl acetate copolymer wherein the ethylene/vinyl acetate ratio is about 91/9 to 72/28 percent by weight.

2. The hot melt adhesive of claim 1 wherein the percent by weight butadiene is 4 to 8 percent.

* * * * *